(12) United States Patent
Mankoff et al.

(10) Patent No.: US 8,484,078 B1
(45) Date of Patent: Jul. 9, 2013

(54) SYSTEMS AND METHODS FOR REGISTERING CONSUMERS IN A CONSUMER PROGRAM WHILE ACCESSING A NETWORK

(71) Applicant: vPromos, Inc., Farmers Branch, TX (US)

(72) Inventors: Jeffrey W. Mankoff, Dallas, TX (US); Bruce Rhoads, Phoenix, AR (US)

(73) Assignee: vPromos, Inc., Farmers Branch, TX (US)

( * ) Notice: Subject to any disclaimer, the term of this patent is extended or adjusted under 35 U.S.C. 154(b) by 0 days.

(21) Appl. No.: 13/708,814

(22) Filed: Dec. 7, 2012

Related U.S. Application Data

(60) Provisional application No. 61/568,637, filed on Dec. 8, 2011.

(51) Int. Cl.
*G06Q 30/00* (2012.01)
(52) U.S. Cl.
USPC .................. 705/14.17; 705/14.23; 705/14.36; 705/14.38; 705/14.39; 705/14.51
(58) Field of Classification Search
USPC .......... 705/14.17, 14.23, 14.36, 14.38, 14.39, 705/14.51
See application file for complete search history.

(56) References Cited

U.S. PATENT DOCUMENTS

| | | | | |
|---|---|---|---|---|
| 8,380,177 B2 * | 2/2013 | Laracey | ...................... | 455/414.1 |
| 2004/0260605 A1 * | 12/2004 | McIntyre et al. | ............... | 705/14 |

| | | | |
|---|---|---|---|
| 2007/0022048 A1 | 1/2007 | Kingsborough et al. | |
| 2010/0106570 A1 | 4/2010 | Radu et al. | |
| 2011/0087530 A1 | 4/2011 | Fordyce et al. | |

FOREIGN PATENT DOCUMENTS

| | | |
|---|---|---|
| KR | 1020070092773 | 9/2007 |
| KR | 1020090038744 | 4/2009 |

OTHER PUBLICATIONS

Definition of "register", downloaded May 11, 2013 from http://www.merriam-webster.com/thesaurus/register[verb].*
International Search Report and Written Opinion mailed Mar. 29, 2013, from International Application No. PCT/US2012/068601, eleven pages.
"Peppercoin Unveils Small Payments Loyalty Platform," Waltham, Mass., Jun. 12, 2006, PR Newswire, 2 pages.

* cited by examiner

*Primary Examiner* — Donald L. Champagne
(74) *Attorney, Agent, or Firm* — Baker & McKenzie, LLP

(57) ABSTRACT

Described are methods and systems for registering consumers with merchant loyalty or other merchant programs by using a credit card or other form of payment to register the consumer, and thereafter automatically recognizing the consumer as a member in the program based on subsequent purchases made using the form of payment. Consumer rewards can then be automatically applied during the purchase transactions with the merchant. Thus, the present disclosure allows for consumers to seamlessly and transparently gain the benefits of consumer programs merely by purchasing goods and services using forms of payment, without consumers needing to carry additional cards or coupons or login information.

30 Claims, 10 Drawing Sheets

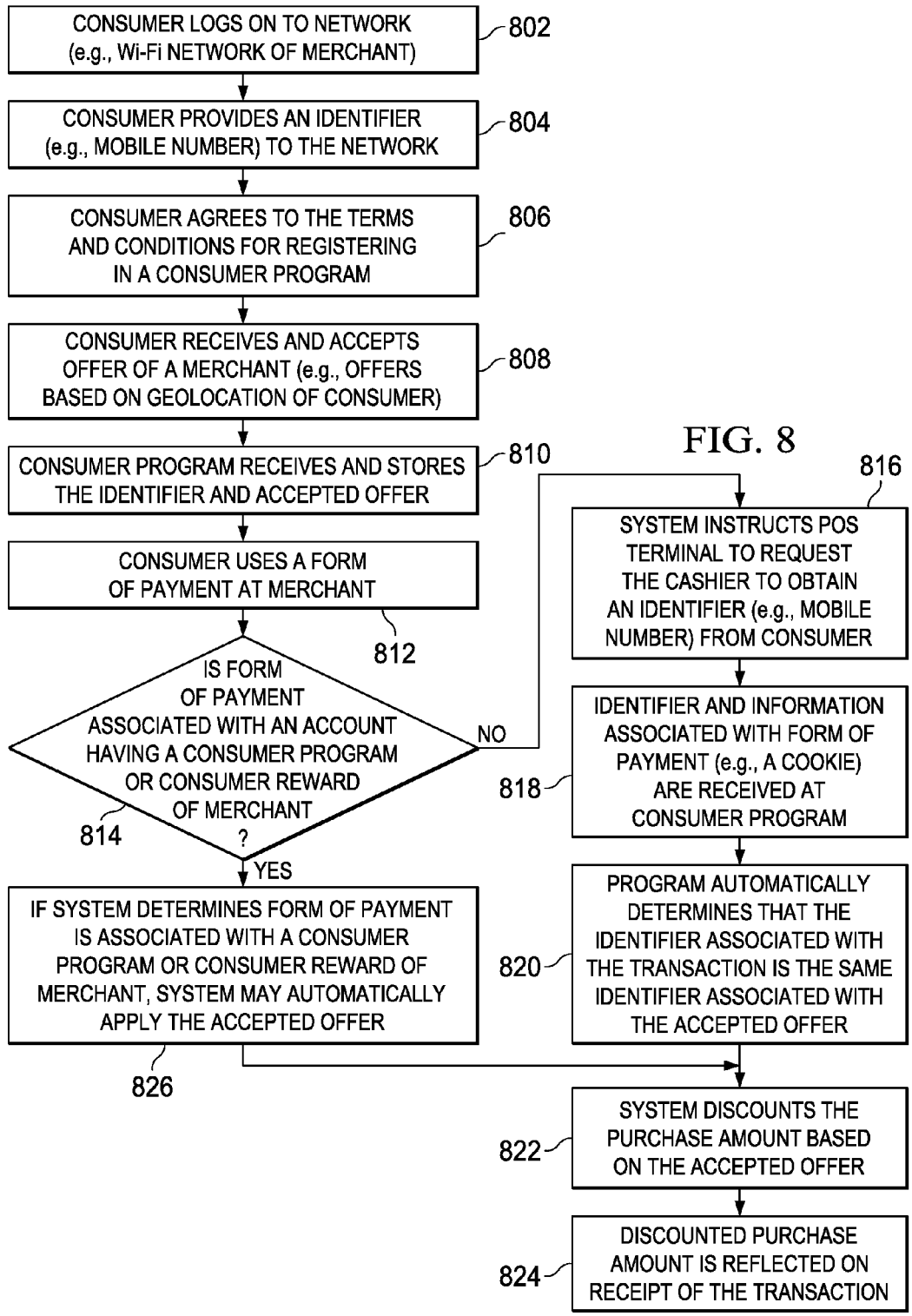

SYSTEMS AND METHODS FOR REGISTERING CONSUMERS IN A CONSUMER PROGRAM WHILE ACCESSING A NETWORK

RELATED APPLICATION INFORMATION

This application claims priority to U.S. Provisional Patent Application No. 61/568,637, entitled "Systems and Methods for Using a Payment System to Register Consumers in a Loyalty Program," filed Dec. 8, 2011, which is incorporated herein by reference in its entirety.

TECHNICAL FIELD

The principles disclosed herein relate generally to consumer programs, and more particularly to registering consumers in a consumer program while accessing a network.

BACKGROUND

On many occasions, consumers may find it desirable to enroll in a consumer program to receive consumer rewards for purchases made at the consumer's favorite online and/or brick-and-mortar merchant stores. In these and other cases, it is often undesirable to carry additional cards or coupons to receive the benefit of brick-and-mortar stores. Gift cards, loyalty cards, and coupons are inconvenient for the recipient as well, in that consumers' wallets are overstuffed with cards and coupons that rarely get used. The recipient must remember to bring the gift card with him to redeem the gift card. Also, often times the gift card has an unknown balance on it. These cards can also be lost and/or expire. With respect to online merchants, it is often undesirable to enroll in separate consumer programs with respect to each online merchant, such that a consumer must not only enroll for each merchant, but the consumer must also remember a particular username and password for each merchant's consumer program. These and other drawbacks exist to the aforementioned, as well as other alternatives to consumer programs and coupons. The present inventors believe that there is a market to use the form of payment made by a consumer at a merchant's store (online and/or brick-and-mortar) to initially register the consumer in a consumer program associated with the merchant's store by linking the consumer's form of payment to the consumer program, such that the merchant can automatically identify the consumer as a member in the consumer program (and the consumer can automatically receive the benefits of the consumer program) when future purchases are made at the merchant by the consumer using a form of payment associated with the consumer.

BRIEF SUMMARY

Disclosed are methods and systems for converting a consumer into a consumer program member of merchant by using the form of payment to register consumer in consumer program and automatically recognize consumer as a member in consumer program based on subsequent purchases made at merchant using form of payment, in which consumer rewards are automatically applied during the purchase transactions. By intercepting the data associated with the form of payment at the payment system in real-time, the present disclosure allows for consumers to register with a consumer program using forms of payment that consumers typically use to purchase products. Thus, the present disclosure allows for consumers to seamlessly and transparently gain the benefits of consumer programs merely by purchasing goods and services using forms of payment, without consumers needing to carry additional cards or coupons or login information. The present disclosure allows for consumers to seamlessly register in a consumer program either by accessing a network that can provide targeted offers to the consumer, at the point of sale, using an activation code, or using a communication request.

The present disclosure provides several important technical advantages that will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

FIG. 8 is an exemplary process flow diagram of an embodiment for registering in a consumer program using a network.

Figure 1:
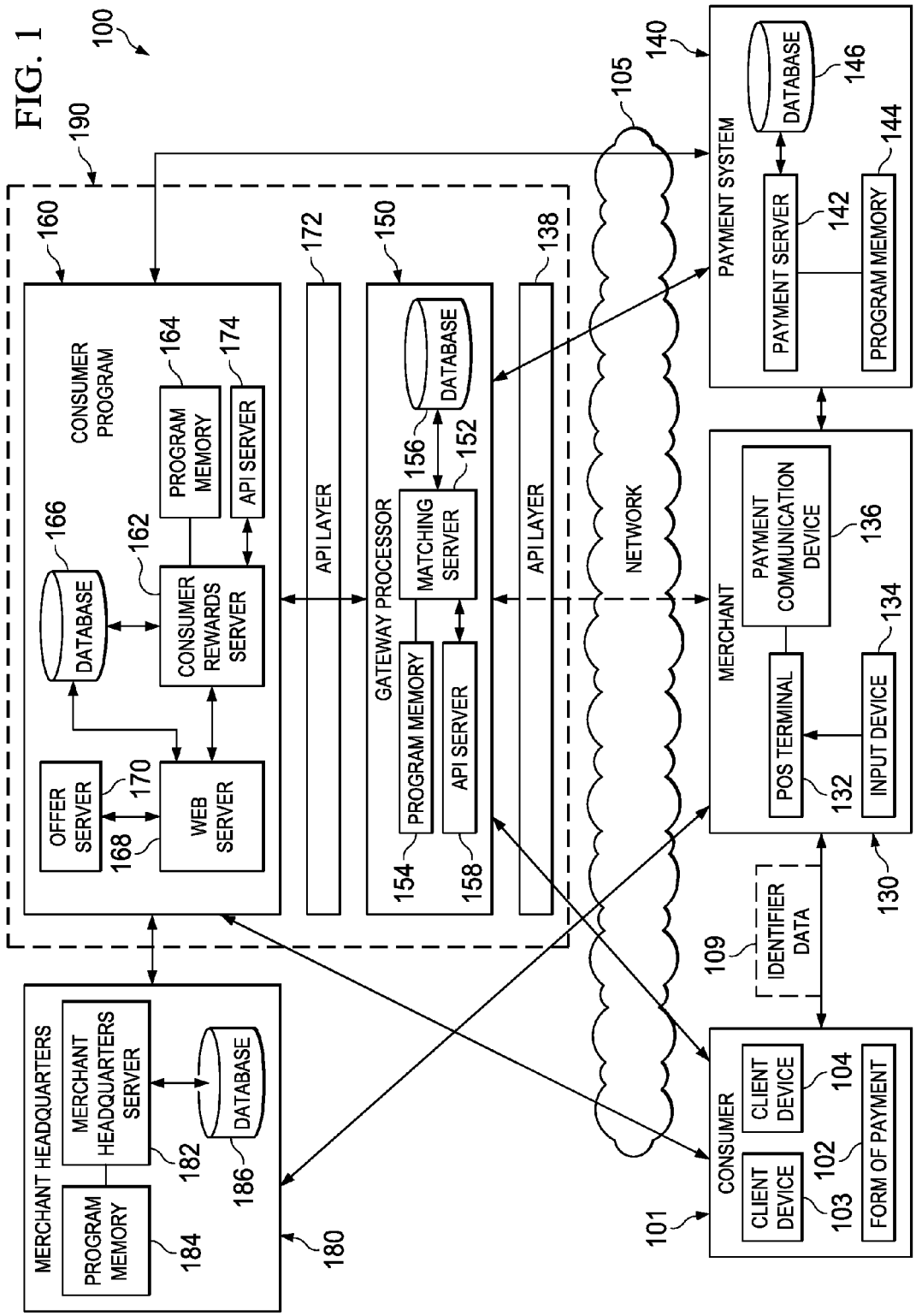
FIG. 1 is a block diagram for a consumer program system that uses a consumer's form of payment to register the consumer in a consumer program, and automatically provides the benefits of the consumer program to the consumer for subsequent purchases made by the consumer.

All of these drawings are illustrations of certain embodiments. The scope of the claims is not limited to the specific embodiments illustrated in the drawings and described below.

DETAILED DESCRIPTION OF THE EMBODIMENTS

FIG. 1 is a block diagram for a consumer program system 100 that uses a consumer's 101 form of payment 102 to register the consumer 101 in a consumer program 160, and automatically provides the benefits of the consumer program 160 to consumer 101 for subsequent purchases made by consumer 101. In some embodiments, consumer 101 may use a form of payment 102, such as a credit card, debit card, electronic fund transfer account, or other payment means with a point of sale ("POS") terminal 132 at a brick-and-mortar merchant 130 to complete a purchase via a payment system 140. In some embodiments, consumer 101 may use a form of payment 102 at an online merchant 130 to complete a purchase via payment system 140. Payment system 140 may determine if the form of payment 102 is associated with consumer program 160, and automatically provide a consumer reward to consumer 101 if form of payment 102 is already registered with consumer program 160. If form of payment 102 is not registered with consumer program 160, merchant 130 may obtain additional data from consumer 101 for consumer 101 to register form of payment 102 and enroll in consumer program 160. System 100 provides an easy way for consumer 101 to register in a consumer program 160, and to receive the benefits of consumer program 160 automatically by using a form of payment 102 at the point of purchase at merchant 130. Thus, consumer program system 100 avoids the hassle, delay and cost of carrying consumer reward cards, gift cards, coupons, and/or remembering unique login/passwords associated with particular merchants 130.

An object of the present disclosure is to provide systems and methods for converting a consumer 101 into a consumer program 160 member of merchant 130 by using the form of payment 102 to register consumer 101 in consumer program 160 and automatically recognize consumer 101 as a member in consumer program 160 based on subsequent purchases made at merchant 130 using form of payment 102, in which consumer rewards are automatically applied during the purchase transactions.

Another object of the present disclosure is to provide systems and methods for registering consumers 101 in consumer program 160 by accessing a network 105 associated with one or more merchants 130. Another object of the present disclosure is to provide systems and methods for presenting consumers 101 with relevant offers or consumer rewards based on the geolocation of consumers 101 and allow consumers 101 to seamlessly register in consumer program 160 during the process of accepting the offers or consumer rewards presented to them by a network 105. Another object of the present disclosure is to provide systems and methods for registering consumers 101 in consumer program 160 using activation codes. A further object of the present disclosure is to provide systems and methods for registering consumers 101 in consumer program 160 using a communication request.

Consumers 101 or patrons 101 of merchants 130 may use any type of client device 103, 104 in use with system 100. For example, client devices 103, 104 may include, but are not limited to, mobile devices; cell phones; laptop computers; desktop computers; end user devices; video monitors; cameras; Personal Digital Assistants ("PDAs"); or any other communication hardware, software, and/or encoded logic that supports the communication of electronic wallets, electronic purchases, web pages, images, videos, text, near field communication electronic signals, or other suitable forms of data. Additionally, in particular embodiments, client devices 103, 104 may include one or more browsers and/or one or more processors operable to execute computer logic and/or software encoded on tangible media that perform the described functionality. Client device 103, 104 may include one or more input devices 134 such as a keyboard, trackball, mouse, and/ or one or more Graphical User Interfaces ("GUIs") through which consumer 101 may interact with the applications running on client device 103, 104. Client device 103, 104 may include any appropriate combination of hardware, software, and/or encoded logic suitable to perform the described functionality. Client device 103, 104 may include memory. Client device 103, 104 may be communicatively coupled to elements in system 100 via network 105 and/or any local networks associated with one or more merchants 130. System 100 may comprise any appropriate number and type of client devices 103, 104.

Form of payment 102 may be anything (e.g., hardware, software, magnetic strip, near field communication transmission, etc.) capable of making a purchase of any type. For example, form of payment 102 may be credit cards, debit cards, electronic wallets, electronic payment accounts, consumer 101 billing systems, cell-phone-based electronic payment systems, PDA-based electronic communication systems, or other payment means. Although form of payment 102 is illustrated in FIG. 1 as an element external to client devices 103, 104, form of payment 102 may be internal to client devices 103, 104. For example, a PDA may be capable of transmitting near field communication electronic signals associated with a form of payment 102 (e.g., mobile wallet) located in client devices 103, 104 or any other element in network 105 to a POS terminal 132 or other device at merchant 130 to complete a purchase.

Network 105 may represent any form of communication network supporting circuit-switched, packet-based, and/or any other suitable type of communications. Network 105 may additionally include any other components of system 100 capable of transmitting and/or receiving information over a communication network, including client devices 103, 104, merchant 130, payment system 140, gateway processor 150, consumer program 160 and/or merchant headquarters 180. Although shown in FIG. 1 as a single element, network 105 may represent one or more separate networks (including all or parts of various different networks) that are separated and serve different respective elements illustrated in FIG. 1. Network 105 may include routers, hubs, switches, firewalls, content switches, gateways, call controllers, and/or any other suitable components in any suitable form or arrangement. Network 105 may include, in whole or in part, one or more secured and/or encrypted Virtual Private Networks ("VPNs") operable to couple one or more network elements together by operating or communicating over elements of a public or external communication network. In general, network 105 may comprise any combination of public or private communication equipment such as elements of the public switched telephone network ("PSTN"), a global computer network such as the Internet, a local area network ("LAN"), a wide area network ("WAN"), a radio access network, a near field communication network, or other appropriate communication equipment.

In some embodiments, network 105 may include one or more local area networks associated with one or more merchants 130. The local area networks associated with one or more merchants 130 may be communicatively coupled to the customer program 160 or any other element illustrated in FIG. 1. As explained in more detail below, system 100 and/or local area networks and/or network 105 may be able to determine the geophysical location of consumers 101 or consumers' 101 client devices 103, 104 to target offers based on their location or based on their access to a particular network 105.

To make purchases, consumers 101 may visit merchants 130—traditional (e.g., physical brick and mortar site having a physical address) or online (e.g., virtual location having an electronic address)—connected to the network 105 as shown in FIG. 1. Consumers 101 may use a form of payment 102 to purchase a service or good provided by merchant 130. The online or traditional merchant 130 may communicate with a payment system 140 (e.g., the credit card issuing bank) whenever the consumers' 101 forms of payment 102 are presented to the merchant 130. At a traditional merchant 130, for instance, the forms of payment 102 may be run at a Point-of-Sale ("POS") terminal 132. The POS terminal 132 may be a standalone terminal, a terminal connected to a cash register at the POS, a wireless device (e.g., wireless tablet), etc. The POS terminal 132 may be connected to an input device 134 and a payment communication device 136. The POS terminal 132 may communicate through a secure connection to a payment system 140 (e.g., a credit card mainframe). This secure connection may be through a security interface unit provided at both ends of the connection between the merchant 130 and payment system 140. The connection between the merchant 130 and the payment system 140 could be through the Internet or through traditional point-to-point communications, such as leased or dial-up telecommunications data lines.

Payment system 140 may include a payment server 142, program memory 144, and a database 146. Payment server 142 processes payments associated with the form of payment 102 used by consumers 101 according to instructions that have been stored in program memory 144. Program memory 144 instructs the operations of payment server 142, and those instructions are stored on computer-readable media. Database 146 stores information related to the form of payment 102 used by consumers 101. Payment system 140 may be any type of hardware and/or software that is capable of processing the payments associated with the form of payment 102 used by consumers 101. For example, payment system 140 may represent a credit card mainframe, credit card interface servers, and/or a debit card or credit card issuing financial institution, etc. Although the functional block represented by payment system 140 is shown as a block at a single site, this broad function may be more specifically implemented using at least two separate sites and/or computer systems. One site as an example may be the acquiring or merchant servicing bank site, which may interface with merchant 130 receiving Authorization Requests ("ARs") and returning Approval Codes ("ACs") through a security interface. The second site in the example may be the credit card issuing bank, which may communicate with the acquiring bank computer system to gather the transaction data and communicate with credit card interface servers in order to determine when to apply appropriate discounts to the consumers' credit card statement. Both the first and the second site may be functionally encompassed within payment system 140.

For example, approval and clearing operation for a form of payment 102 with payment system 140 may occur as follows. The consumer 101 may give his card to the merchant 130 employee, who may swipe the card through a credit card reader associated with the POS terminal 132 as is normally done in a credit card transaction. Merchant 130 may then communicate with the payment system 140 in order to seek an authorization code for the transaction from the payment system 140. The payment system 140 may then communicate with gateway processor 150, and/or consumer program 160 to determine whether the consumer 101 and/or form of payment 102 are registered or associated with a consumer program 160 regarding the purchase made at merchant 130. Consumer 101 is entitled to a discount according to that consumer's 101 purchases at the merchant 130. Payment system 140 may also gather the necessary data offline, e.g., separate from the regular credit card authorization process. The interface for this clearing process may alternatively be an entirely parallel network between the merchant 130 and the payment system 140.

Figure 5:
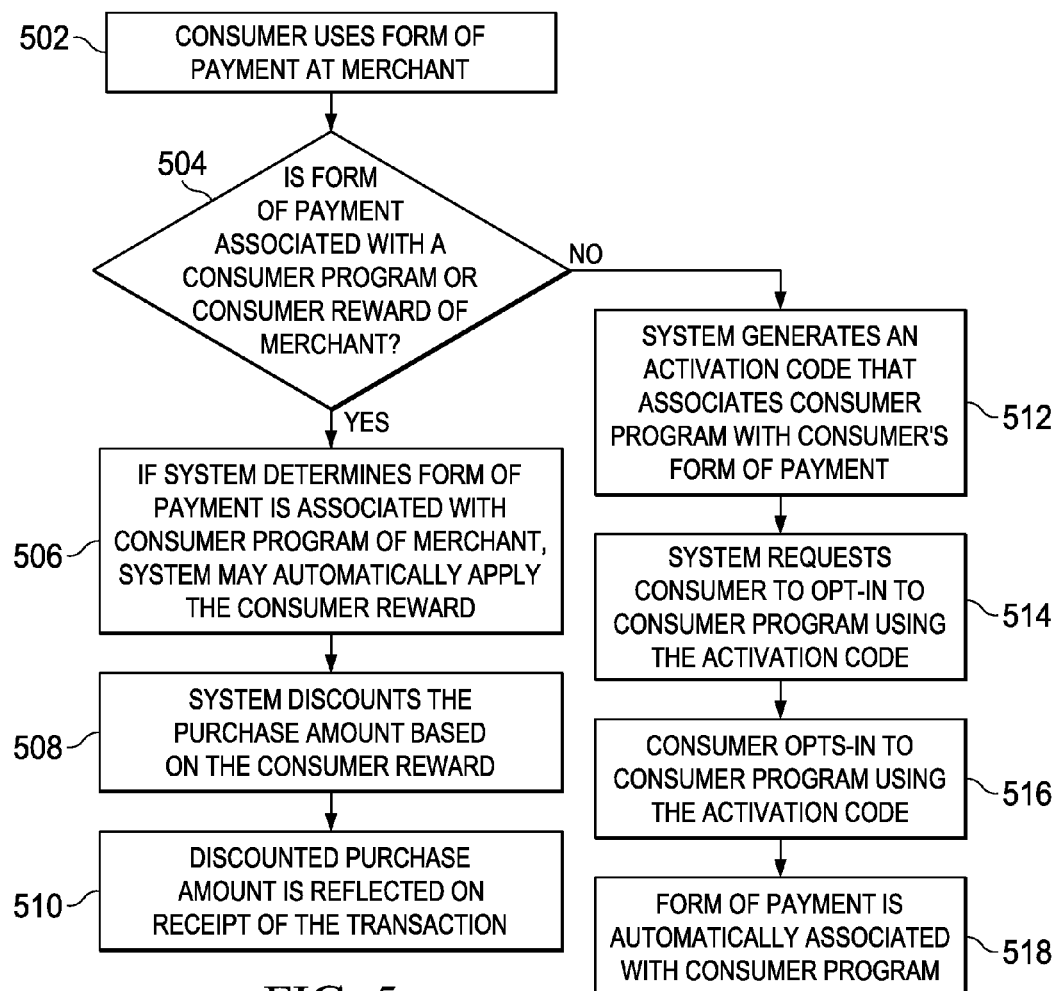
FIG. 5 is an exemplary process flow diagram of an embodiment for registering in a consumer program using an activation code.

Gateway processor 150 may include matching server 152, program memory 154, database 156. In an embodiment where there is an API layer 138 between merchant 130 and gateway processor 150, gateway processor 150 further comprises an API server 158. Matching server 152 may be used for determining whether a consumer's 101 form of payment 102 is associated with a consumer program 160. Matching server 152 may also be used for storing information in database 156. Database 156 may include an entry linking a consumer's 101 name, one or more addresses for consumer 101, one or more forms of payment 102, one or more electronic addresses of client devices 103, 104, one or more phone numbers, one or more passwords associated with consumer program 160, one or more consumer programs 160, one or more consumer rewards, one or more expiration dates associated with the one or more consumer rewards, etc. Matching server 152 may use database 156 to keep track of a consumer's 101 profile, including what offers consumer 101 has accepted, what offers the consumer 101 has declined, and other information related to the consumer 101. The matching server 152 may also generate activation codes, as illustrated in FIG. 5. The matching server 152 may have program memory 154, which implements the functionality to be performed by the matching server 152. Matching server 152 operates according to instructions that have been stored in program memory 154. Program memory 154 instructs the operations of matching server 152, and those instructions are stored on computer-readable media.

Matching server 152 may be used to link consumers 101, consumer rewards, and/or consumer programs 160 with one or more forms of payment 102 of consumer 101 in database 156. System 100 may utilize matching server 152 and/or database 156 to determine if payment transactions cleared through payment system 140 are associated with a form of payment 102 stored in matching server 152 and/or database 156. In an embodiment, when a consumer 101 presents a form of payment 102 at a merchant 130, the POS terminal 132 or payment communication device 136 may communicate with matching server 152 to determine if consumer 101 is registered in consumer program 160 based on the form of payment 102 presented. Through these linkages, proper credit or consumer rewards can be applied in those instances in which consumers 101 make a purchase associated with a consumer program 160 stored in their database 156. For example, every time consumer 101 uses a form of payment 102 at a merchant 130, payment system 140 may communicate with matching server 152 or database 156 to determine if a consumer reward or consumer program 160 is associated with the form of payment 102 and/or the merchant 130 and/or the goods or services purchased. An advantage of system 100 is that consumer 101 does not need to remember to carry a special card or remember a special identifier associated with a particular consumer program 160 because system 100 allows for consumers 101 to use forms of payment 102, as normal, and gain the benefits of being enrolled in a consumer program 160 without the hassles of needing to carry a special card or identifier.

Consumer program 160 may be anything that incentives consumers 101 to make purchases at merchant 130 associated with consumer program 160. In an embodiment, consumer program 160 and gateway processor 150 are a consumer program system 190. Consumer program 160 may be any type of hardware (e.g., web server) and/or software (e.g., web site) that uses any type of consumer rewards to provide an incentive for consumer 101 to make a purchase at merchant 130. For example, consumer program 160 may provide electronic punches to consumer 101 upon the completion of certain events (e.g., registering form of payment 102 with consumer program 160, every $10 purchased, referring another consumer 101 to register in consumer program 160, buying a virtual electronic gift for another consumer 101, etc.), in which the electronic punches may be automatically redeemed for consumer rewards.

Consumer program 160 may include a consumer rewards server 162, program memory 164, database 166, web server 168, offer server 170, and API server 174. API server 174 interfaces with gateway processor 150 via API layer 172. Consumer rewards server 162 may be used for storing information in database 166, including information related to a consumer 101, client device 103, 104, form of payment 102, and/or consumer program 160. Consumer rewards server 162 may use database 166 to keep track of a consumer's 101 profile, including what offers consumer 101 has accepted, what offers the consumer 101 has declined, and other information related to the consumer 101. Consumer rewards server 162 may comprise program memory 164, which implements the functionality to be performed by the consumer rewards server 162 at consumer program 160. Consumer rewards server 162 operates according to instructions that have been stored in program memory 164. Program memory 164 instructs the operations of consumer rewards server 162, and those instructions are stored on computer-readable media.

Offer server 170 may be used for storing consumer rewards offers received from merchant headquarters server 182. Offer server 170 may also be used for transmitting consumer rewards offers to web server 168. Offer server 170 may comprise program memory, which implements the functionality to be performed by the offer server 170 at consumer program 160. Offer server 170 operates according to instructions that have been stored in program memory. Program memory instructs the operations of offer server 170, and those instructions are stored on computer-readable media. Web server 168 may present consumer rewards offers to consumers' 101 client devices 103, 104 via websites. Web server 168 may comprise program memory, which implements the functionality to be performed by the web server 168. Web server 168 operates according to instructions that have been stored in program memory. Program memory instructs the operations of web server 168, and those instructions are stored on computer-readable media.

Merchant headquarters 180 may include a merchant headquarters server 182, program memory 184, and a database 186. Merchant headquarters server 182 may comprise program memory 184, which implements the functionality to be performed by the merchant headquarters server 182 at merchant headquarters 180. Merchant headquarters server 182 operates according to instructions that have been stored in program memory 184. Program memory 184 instructs the operations of merchant headquarters server 182, and those instructions are stored on computer-readable media. Consumer rewards offers are defined by merchant headquarters server 182 at merchant headquarters 180 and are stored in database 186. Consumer rewards may be any type of paperless credit (e.g., an electronic virtual gift for $10) or coupon or discount (e.g., $2 off a purchase of $10 or more) associated with consumer program 160 that may be gained as a result of completing purchases at merchants 130 associated with consumer program 160. Consumer rewards offers may be transmitted from merchant headquarters server 182 to offer server 170 at connection 188. Merchant headquarters server 182 may also receive information from offer server 170 tracking redemptions of consumer rewards at connection 190, and redemption information may be stored in database 186.

The consumer rewards associated with the consumer program 160 for a particular merchant 130 can be applied in a number of ways. One way is to transmit the consumer reward or discount back to the POS terminal 132 through the security interfaces as a part of the normal credit card approval process. A second way may be to apply the consumer reward or discount to the monthly statement of the consumer 101 in the payment system 140. And a third way may be for the consumer rewards or discounts to be accumulated and reimbursed to the consumer 101 through the issuance of monetary payment or other items of value from either the payment system 140, merchant 130, or consumer program 160.

The direct association of consumer programs 160 and consumer rewards with the consumers' 101 payment systems 140 and forms of payment 102 in databases 156, 166 can make the targeted offers more flexible. In a specific example, a particular offer of a consumer program 160 and/or consumer reward can be made to a consumer 101 for a merchant 130 that is close to the consumer 101 based on the consumer's 101 location. Such offers could, for example, be advantageously delivered to consumers' 101 client devices 103, 104, such as cell phones or wireless PDAs, based on the consumers' 101 detected locations. Rather than delivering an offer to be displayed on such client devices 103, 104 for display to a merchant 130 as a means of redemption, the present embodiments allow consumers 101 to electronically enroll in and accept the consumer reward and have those offers automatically be associated with the consumers' 101 credit cards or other payment systems 140. As with paper coupons, this electronic acceptance and association with the consumers' 101 payment system 140 also mitigates against possible fraudulent attempts to redeem invalid offers, such as by displaying a contrived or unauthorized offer screen to the merchants 130. The described embodiments further may negate the need for the merchant 130 to install additional equipment.

Because consumer 101 has been freed from the necessity of printing out or carrying paper coupons or consumer rewards cards, the consumer 101 can register in a consumer program 160 and automatically associate the consumer program 160 and consumer rewards with the consumer's 101 form of payment 102. Also, because of the immediacy of linking consumer program 160 and consumer rewards with the consumer's 101 form of payment 102 or on payment system 140, as well as the trackability of client devices 103, 104 it is readily possible to make the consumer reward time-adaptable. For example, the consumer 101 might be in the vicinity of Merchant XYZ 130, and the consumer 101 accordingly might be given a consumer reward for 25% off of purchases at that merchant 130 made within 3 hours (or, as another example, the same day). The consumer reward might decrease 5% in value during the next time period (e.g., between 3 hours and 12 hours or during the next day), and decrease another 5% in the next period, and so on.

An object of the present disclosure is to provide a method for converting a consumer 101 into a consumer program 160 member of merchant 130 by using the form of payment 102 to register consumer 101 in consumer program 160 and automatically recognize consumer 101 as a member in consumer program 160 based on subsequent purchases made at merchant 130 using form of payment 102, in which consumer rewards are automatically applied during the purchase transactions.

Because one or more forms of payment 102 of consumer 101 is already stored on system 100, these forms of payment 102 (or account number for other type of payment vehicle) can be added to the consumer program 160 for merchant 130, and then be used to track every time the consumer 101, and now consumer program 160 member, shops at merchant 130 with one of the registered forms of payment 102 associated with the consumer program 160. As such, points can be earned automatically for consumer program 160 and consumer rewards on behalf of consumer 101. Such an approach differs from a conventional consumer rewards system because it provides a means to conveniently migrate a consumer 101 at a merchant 130 into a consumer reward/consumer program 160 member of a particular merchant 130. Thus, system 100 may provide incentives for consumers 101 to continually make purchases at merchant 130.

In some embodiments, system 100 can automatically determine additional forms of payment 102 associated with consumer 101, upon the purchase or registration associated with one form of payment 102 used in system 100. Thus, system 100 allows consumer 101 to use multiple forms of payment 102 (even if it was not the form of payment 102 used to register in consumer program 160) that can automatically be recognized by system 100 to link the form of payment 102 with consumer program 160 and/or consumer reward during the purchase.

Each of form of payment 102, client devices 103, 104, merchant 130, POS terminal 132, payment communication device 136, payment system 140, gateway 142, payment server 144, reward processing system 150, matching server 152, consumer program 160, consumer rewards server 162, web server 168, offer server 170, merchant headquarters 180, merchant headquarters server 182, databases 146, 156, 166, 186, and/or program memory 154, 164, 184 may represent any appropriate combination of hardware (e.g., servers, processors and/or memory), logic, and/or software suitable to perform the described functions. Some embodiments of the disclosure may include logic and/or software contained within a medium. The medium may include RAM, ROM, or disk drives. The medium may be non-transitory. In some embodiments, the logic and/or software may be contained within hardware configuration. The logic and/or software may also be embedded within any other suitable medium without departing from the scope of the disclosure. Processor may represent and/or include any form of processing component, including general purpose computers, dedicated microprocessors, or other processing devices capable of processing electronic information. Examples of processor include digital signal processors ("DSPs"), application-specific integrated circuits ("ASICs"), field-programmable gate arrays ("FPGAs"), and any other suitable specific or general purpose processors. Memory may store processor instructions, information resources, and/or any other suitable information. Memory may comprise any collection and arrangement of volatile and/or non-volatile components suitable for storing data. For example, memory may comprise random access memory ("RAM") devices, read only memory ("ROM") devices, magnetic storage devices, optical storage devices, and/or any other suitable data storage devices. In particular embodiments, memory may represent, in part, computer-readable storage media on which computer instructions and/or logic are encoded.

Although not illustrated as part of the same entity or location, in some embodiments one or more functional blocks illustrated in FIG. 1 may be part of the same entity or location. For example, reward processing system 150 may be associated with the same entity or location as merchant 130, payment system 140, consumer program 160, or merchant headquarters 180.

As discussed in FIG. 8 below, in some embodiments, registration in consumer program 160 may occur when a consumer 101 accesses a network 105 that may be associated with one or more merchants 130. After seamlessly registering in a consumer program 160 while accessing the network 105, consumers 101 may receive targeted offers for particular merchants 130 based on their access of a particular network 105 or based on their geophysical location. Thus, the present disclosure allows for consumers 101 to seamlessly register for and accept targeted offers for merchants 130 in their areas to immediately take advantage of an offer for a purchase at a nearby merchant 130.

As discussed in FIG. 3 below, in some embodiments, registration in consumer program 160 may occur at the point of sale at a POS terminal 132 or online transaction by automatically linking and registering consumer's 101 form of payment 102 with consumer program 160. For example, upon presentment of form of payment 102, merchant 130 and/or POS terminal 132 may automatically determine if the form of payment 102 used to make the purchase is associated with the merchant's 130 consumer program 160. If the form of payment 102 is not associated with a consumer program 160, merchant 130 may ask consumer 101 if consumer 102 would like to opt-in and register in consumer program 160.

The mechanism in which merchant 130 can request whether consumer 101 opts-in and registers for consumer program 160 can occur in any manner. For example, upon recognizing that form of payment 102 is not associated with merchant's 130 consumer program 160, merchant 130 (or any other element in FIG. 1, such as consumer program 160) may initiate a communication (e.g., e-mail, text message, webpage, post to consumer's 101 social web site, near-field communication, employee of merchant 130 asking consumer 101, etc.) to client device 103, 104 asking if consumer 101 desires to opt-in and register for consumer program 160. Consumer 101 may be requested to provide identifier data 109 (e.g., client address, mobile wallet identifier, phone number, e-mail address, name of consumer 101, address of consumer 101, username, etc.) to merchant 130 (or any other element in FIG. 1) to complete registration in consumer program 160. In some embodiments, the opt-in process may utilize the POS terminal 132 used in connection with the form of payment 102 to make the purchase, as described in more detail in FIG. 2. For example, consumer 101 may provide identifier data 109 via POS terminal 132 during the point of purchase. In some embodiments, the POS terminal 132 may not require a software or hardware modification to achieve the teachings of this disclosure. In some embodiments, a merchant 130 may request identifier data 109 (e.g., mobile phone number) from consumer 101 so that merchant 130 has identifier data 109 to send an opt-in message to consumer 101 for registering form of payment 102 with consumer program 160.

The opt-in message may provide instructions for consumer 101 and/or client device 103, 104 to register in consumer program 160. The process for registering a consumer 101 may have one or many steps to complete the registration. In some embodiments, consumer 101 and/or form of payment 102 may be automatically registered into consumer program 160 during the initial purchase made using the form of payment 102 at merchant 130. For example, a client device 103, 104 (e.g., mobile phone) may use near field communications to transmit its form of payment 102 (e.g., mobile wallet or mobile bank account) information to a POS terminal 132 at merchant 130 to complete the purchase. Transparent to the consumer 101, POS terminal 132 may automatically determine the address of client device 103, 104 and send an opt-in request message to client device 103, 104 asking if consumer 101 would like to enroll in consumer program 160, or asking consumer 101 for other identifier data 109. Consumer 101 can opt-in and register in consumer program 160 via client device 103, 104 seamlessly and easily.

In some embodiments, a communication request may require the consumer 101 to reply with another communication with "Y" or "Yes" to confirm enrollment in the consumer program 160. Upon confirming enrollment, system 100 may send a follow-up communication that welcomes consumer 101 to the consumer program 160. In some embodiments, the follow-up communication may require consumer 101 to complete one or more steps via a web site or other means to complete registration. In some embodiments, consumer 101 may be automatically registered without having to access a web site or submit any further information. In some embodiments, consumer 101 may need to agree to certain terms and conditions of consumer program 160.

In some embodiments, an activation code linked to consumer's 101 form of payment 102 may be used to complete registration in consumer program 160 via a web site or other means, as described in FIG. 5. In some embodiments, the activation code may be provided to consumer 101 on a receipt printed by POS terminal 132 at the point of sale, as described in FIG. 6. In some embodiments, system 100 may send an activation code to the consumer 101 via text message or other form of communication, as described in FIG. 7.

After consumer 101 and/or form of payment 102 have been registered with consumer program 160, system 100 can recognize that form of payment 102 used to complete a purchase is registered with consumer program 160. For example, POS terminal 132 or web server can communicate with payment system 140, consumer program 160, and/or matching server 152 to determine if the form of payment 102 is registered with a consumer program 160 associated with the purchase. Further, system 100 can automatically apply consumer rewards (e.g., discount, gift, coupon, etc.) to the purchase during the point of sale, in which the receipt identifies the purchase price in addition to the consumer reward applied to the purchase. In some embodiments, the consumer reward may be automatically applied. In some embodiments, the consumer 101 may be asked if they desire to apply a consumer reward for the purchase being made. For example, if consumer 101 has a consumer reward offering $3 off the next purchase at merchant 130, then system 100 may automatically deduct $3 off the total purchase price by automatically determining form of payment 102 is associated with a consumer program 160 with a consumer reward that should be applied to the current transaction. For example, upon use of the form of payment 102, merchant 130 may send an Authorization Request ("AR") to the payment system 140. In such a transaction, entity logically referred to here as payment system 140 may be comprised of a credit clearing bank or acquiring bank computer system that communicates with the merchant 130, a credit card issuing computer system that manages the cardholder/consumer 101 accounts, and a credit card association server that is associated with the particular credit card association, such as Visa® or MasterCard®. These various servers all communicate in order to clear the ARs and reconcile the cardholders' credit card statements. Once the AR has been cleared, the payment system 140, which as discussed above comprises the servers of one or more entities, may send an Approval Code ("AC") back to the merchant 130 for the requested transaction. This transaction will also trigger the redemption of consumer rewards for qualifying purchases in which the form of payment 102 is registered with a consumer program 160 associated with merchant 130, although there are be a number of possible methods by which this redemption can be accomplished.

System 100 may send notification to consumer 101 that a consumer reward has been redeemed or applied to purchase goods or services at merchant 130. System 100 applies discount or credit of consumer reward to the purchase made by consumer 101. For example, if consumer reward was for 20% off purchases made at merchant 130, then this discount may be automatically applied at the POS terminal 132 or at checkout at an online merchant 130. In another example, if the consumer reward was for a $15 credit to use at merchant 130, then this credit may be automatically applied to the final total of the purchase made at the POS terminal 132 or at checkout at an online merchant 130.

In some embodiments, consumer 101 may register form of payment 102 with consumer program 160 prior to purchase of goods or services at the point of sale. For example, consumer 101 may register form of payment 102 with consumer program 160 via a web site. In another example, consumer 101 may be presented with a consumer reward (e.g., virtual coupon, virtual gift or credit, etc.) via a web site, a social network site, a text message, an e-mail, a banner advertisement, etc. that consumer 101 may accept, which may begin the process of consumer 101 registering form of payment 102 to be linked with the consumer program 160 associated with the consumer reward. Thus, when consumer 101 purchases goods or services at merchant 130 associated with the consumer reward, the system automatically determines that the form of payment 102 is linked to the consumer reward, and automatically redeems the consumer reward at the point of sale.

Figure 2:
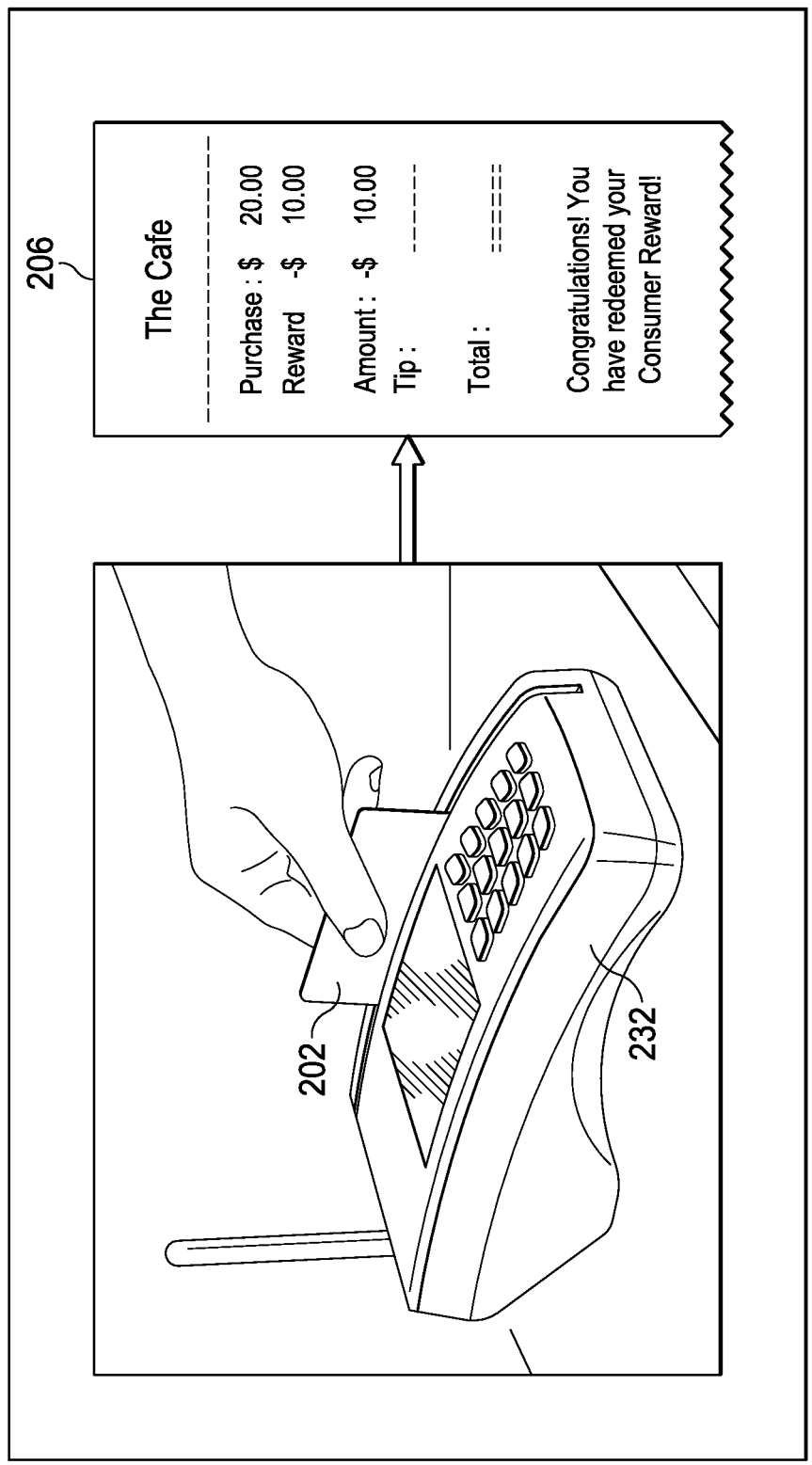
FIG. 2 is a block diagram of a consumer's form of payment that may automatically receive the benefits of a consumer program upon making a purchase at a point of sale device.

Illustrated in FIG. 2 is a block diagram of the system 100 of FIG. 1. This figure illustrates the interaction between some of the system elements described in FIG. 1. While there are certain elements shown in FIG. 1 that are not illustrated in FIG. 2 and vice versa, one of ordinary skill in the art would be able to advantageously describe with respect to one figure in order to achieve the advantages described herein for operation with the embodiments shown in other figures. All such embodiments are understood by one of ordinary skill in the art to be encompassed within the present specification. Within the system 100, the consumer 101 may use a form of payment 202 to register in the consumer program 160, and automatically and transparently redeem consumer rewards. In some embodiments, consumer's 101 form of payment 202 may be processed by a POS terminal 232 at a merchant 130 to purchase goods or services associated with consumer program 160 and consumer reward. Upon purchase, POS terminal 232 may automatically redeem consumer rewards to the purchase as illustrated in the exemplary receipt 206 of the purchase made at the merchant 130 known as The Cafe.

In some embodiments, employee of merchant 130 may ask consumer 101 if consumer 101 is a member of merchant's 130 consumer program 160. If not, consumer 101 may begin registering form of payment 202 with consumer program 160. In some embodiments, registration of a consumer 101 may require the form of payment 202 and, in some embodiments, a unique identifier 109 (e.g., mobile phone number) or other data may also be required, such as a first name, last name, zip code, and agreement that the consumer 101 is over the age of 13 and agrees to the terms and conditions of the consumer program 160. In some embodiments, registration of consumer 101 in consumer program 160 can be completed at the point of sale. For example, employee of merchant 130 may ask consumer 101 if consumer 101 would like to join, and if the consumer 101 agrees, the waiter can ask consumer 101 for unique identifier 109 along with the form of payment 202 (e.g., credit card).

In embodiments in which a brick-and-mortar merchant 130 uses a POS terminal 204 to complete the purchase, employee of merchant 130 may click a button to begin the communication flow for registering a consumer 101 in consumer program 160. Employee of merchant 130 may use the buttons of POS terminal 204 to input the unique identifier 109 (e.g., mobile phone number). Next, employee may swipe form of payment 202 with POS terminal 204 (or use near field communications to transmit mobile wallet data 202 to POS terminal 204), when prompted by POS terminal 204. POS terminal 204 or any other device may tokenize data associated with form of payment 202, along with the unique identifier 109 and other data provided by consumer 101, and transmit it to payment system 140, consumer program 160, and/or payment matching system 160. In some embodiments, certain identifying information of consumer 101 may be obtained from form of payment 202. For example, form of payment 202 may be a credit card with a magnetic stripe or a mobile wallet that may include additional information about consumer 101.

Figure 3:
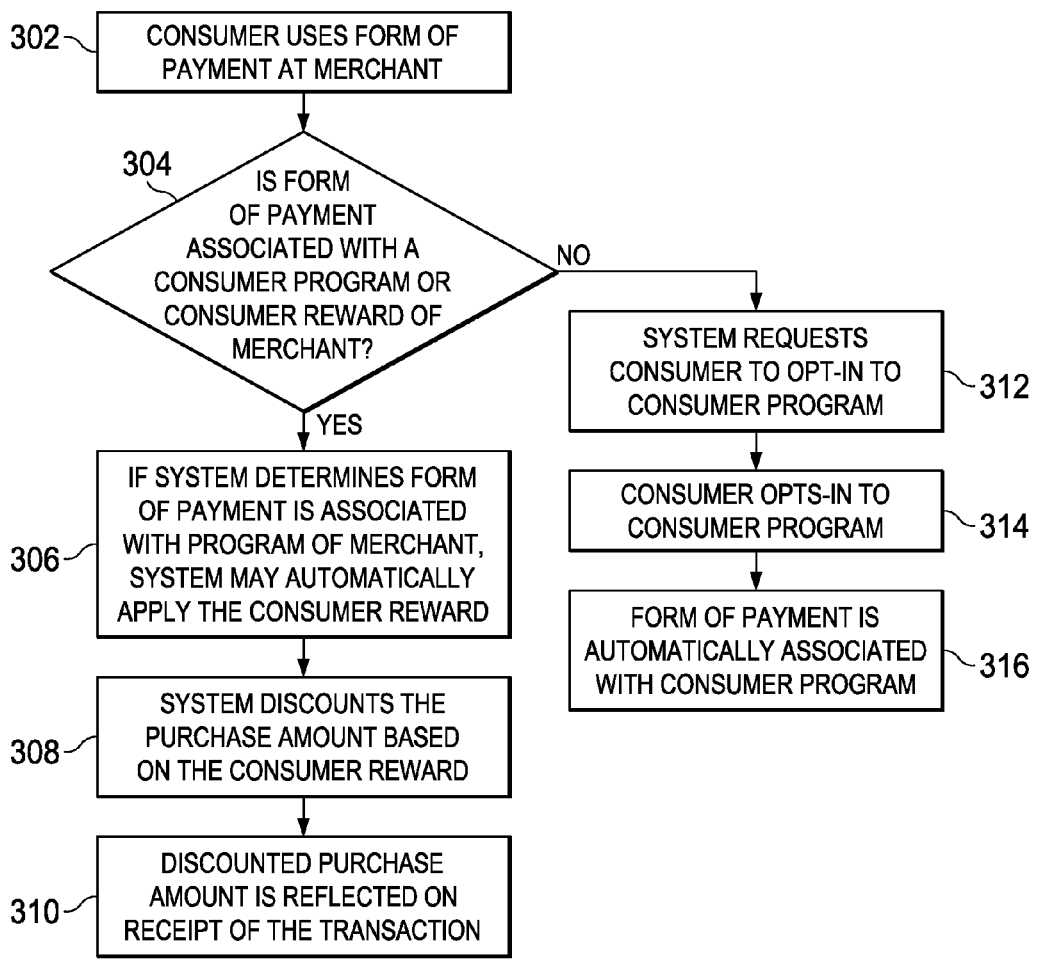
FIG. 3 is an exemplary process flow diagram for registering in a consumer program using a payment system.

Illustrated in FIG. 3 is an exemplary flow diagram illustrating an embodiment for registering in the consumer program 160 of the system 100 of FIG. 1. This figure illustrates the interaction between some of the system elements described in FIG. 1. While there are certain elements shown in FIG. 1 that are not illustrated in FIG. 3 and vice versa, one of ordinary skill in the art would be able to advantageously describe with respect to one figure in order to achieve the advantages described herein for operation with the embodiments shown in other figures. All such embodiments are understood by one of ordinary skill in the art to be encompassed within the present specification. Within the system 100 of FIG. 1, a payment system 140 may be used to register consumers 101 in a consumer program 160. At step 302, consumer 101 uses form of payment 102 to make a purchase at merchant 130. At step 304, merchant 130 determines if form of payment 102 is registered or not. If form of payment 102 is not registered, merchant 130 registers form of payment 102 with consumer program 160. In some embodiments, registration in consumer program 160 may occur at the point of sale at a POS terminal 132 or online transaction by automatically linking and registering consumer's 101 form of payment 102 with consumer program 160. For example, upon presentment of form of payment 102, merchant 130 and/or POS terminal 132 may automatically determine if the form of payment 102 used to make the purchase is associated with the merchant's 130 consumer program 160.

At step 312, system may request for consumer 101 to opt-in to consumer program 160. The mechanism in which merchant 130 can request whether consumer 101 opts-in and registers for consumer program 160 can occur in any manner. For example, upon recognizing that form of payment 102 is not associated with merchant's 130 consumer program 160, merchant 130 (or any other element in FIG. 1, such as consumer program 160) may initiate a communication (e.g., e-mail, text message, web-page, post to consumer's 101 social web site, near field communication, employee of merchant 130 asking consumer 101, etc.) to client device 103, 104 asking if consumer 101 desires to opt-in and register for consumer program 160. Consumer 101 may be requested to provide identifier data 109 (e.g., client address, mobile wallet identifier, phone number, e-mail address, name of consumer 101, address of consumer 101, username, etc.) to merchant 130 (or any other element in FIG. 1) to complete registration in consumer program 160. In some embodiments, the opt-in process may utilize the POS terminal 132 used in connection with the form of payment 102 to make the purchase, as described above in more detail in FIG. 2. For example, consumer 101 may provide identifier data 109 via POS terminal 132 during the point of purchase. In some embodiments, the POS terminal 132 may not require a software or hardware modification to achieve the teachings of this disclosure. In some embodiments, a merchant 130 may request identifier data 109 (e.g., mobile phone number) from consumer 101 so that merchant 130 has identifier data 109 to send an opt-in message to consumer 101 for registering form of payment 102 with consumer program 160. The opt-in message may provide instructions for consumer 101 and/or client device 103, 104 to register in consumer program 160.

At step 314, the consumer 101 may opt-in to the consumer program 160. The process for registering a consumer 101 may have one or many steps to complete the registration. In some embodiments, consumer 101 and/or form of payment 102 may be automatically registered into consumer program 160 during the initial purchase made using the form of payment 102 at merchant 130. For example, a client device 103, 104 (e.g., mobile phone) may use near field communications to transmit its form of payment 102 (e.g., mobile wallet or mobile bank account) information to a POS terminal 132 at merchant 130 to complete the purchase. Transparent to the consumer 101, POS terminal 132 may automatically determine the address of client device 103, 104 and send an opt-in request message to client device 103, 104 asking if consumer 101 would like to enroll in consumer program 160, or asking consumer 101 for other identifier data 109. Consumer 101 can opt-in and register in consumer program 160 via client device 103, 104 seamlessly and easily.

Figure 4:
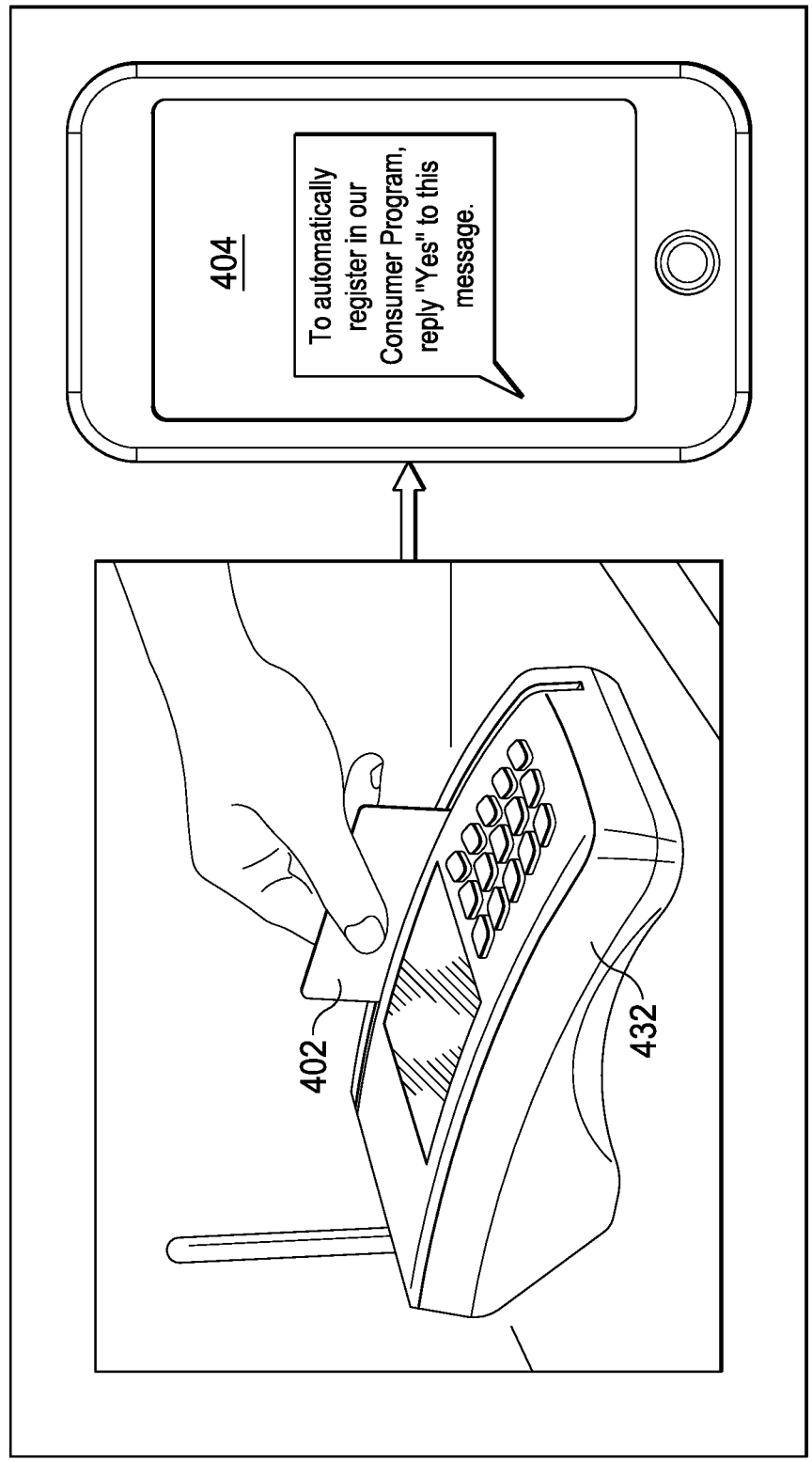
FIG. 4 is an exemplary block diagram of an embodiment for registering in a consumer program at the point of sale.

In some embodiments, a communication request may require the consumer 101 to reply with another communication with "Y" or "Yes" to confirm enrollment in the consumer program 160, as further described in FIG. 4. Upon confirming enrollment, system 100 may send a follow-up communication that welcomes consumer 101 to the consumer program 160. In some embodiments, the follow-up communication may require consumer 101 to complete one or more steps via a web site or other means to complete registration. In some embodiments, consumer 101 may be automatically registered without having to access a web site or submit any further information. In some embodiments, consumer 101 may need to agree to certain terms and conditions of consumer program 160.

At step 316, if merchant determines that form of payment 102 is associated with a consumer program 160, merchant 130 can automatically track the consumer's 101 transaction and automatically redeem consumer rewards for purchases at the point of sale. System 100 can recognize that form of payment 102 used to complete a purchase is registered with consumer program 160. For example, POS terminal 132 or web server can communicate with payment system 140, consumer program 160, and/or matching server 152 to determine if the form of payment 102 is registered with a consumer program 160 associated with the purchase.

At step 308, system 100 can automatically apply consumer rewards (e.g., discount, gift, coupon, etc.) to the purchase during the point of sale, in which the receipt identifies the purchase price in addition to the consumer reward applied to the purchase at step 310. In some embodiments, the consumer reward may be automatically applied. In some embodiments, the consumer 101 may be asked if they desire to apply a consumer reward for the purchase being made. For example, if consumer 101 has a consumer reward offering $3 off the next purchase at merchant 130, then system 100 may automatically deduct $3 off the total purchase price by automatically determining form of payment 102 is associated with a consumer program 160 with a consumer reward that should be applied to the current transaction. For example, upon use of the form of payment 102, merchant 130 may send an Authorization Request ("AR") to the payment system 140. In such a transaction, entity logically referred to here as payment system 140 may be comprised of a credit clearing bank or acquiring bank computer system that communicates with the merchant 130, a credit card issuing computer system that manages the cardholder/consumer 101 accounts, and a credit card association server that is associated with the particular credit card association, such as Visa® or MasterCard®. These various servers all communicate in order to clear the ARs and reconcile the cardholders' credit card statements. Once the AR has been cleared, the payment system 140, which as discussed above comprises the servers of one or more entities, may send an Approval Code ("AC") back to the merchant 130 for the requested transaction. This transaction will also trigger the redemption of consumer rewards for qualifying purchases in which the form of payment 102 is registered with a consumer program 160 associated with merchant 130, although there are be a number of possible methods by which this redemption can be accomplished.

System 100 may send notification to consumer 101 that a consumer reward has been redeemed or applied to purchase goods or services at merchant 130. System 100 applies discount or credit of consumer reward to the purchase made by consumer 101. For example, if consumer reward was for 20% off purchases made at merchant 130, then this discount may be automatically applied at the POS terminal 132 or at checkout at an online merchant 130. In another example, if the consumer reward was for a $15 credit to use at merchant 130, then this credit may be automatically applied to the final total of the purchase made at the POS terminal 132 or at checkout at an online merchant 130.

Illustrated in FIG. 4 is an exemplary block diagram illustrating an embodiment for registering in the consumer program 160 of the system 100 of FIG. 1. This figure illustrates the interaction between some of the system elements described in FIG. 1. While there are certain elements shown in FIG. 1 that are not illustrated in FIG. 4 and vice versa, one of ordinary skill in the art would be able to advantageously describe with respect to one figure in order to achieve the advantages described herein for operation with the embodiments shown in other figures. All such embodiments are understood by one of ordinary skill in the art to be encompassed within the present specification. Within the system 100 of FIG. 1, at the point of sale, employee of merchant 130 may ask consumer 101 if consumer 101 would like to join a consumer program 160, and if the consumer 101 agrees, the merchant 130 can ask consumer 101 for a unique identifier 109 (e.g., mobile phone number) or other data, such as a first name, last name, zip code, and agreement that the consumer 101 is over the age of 13 and agrees to the terms and conditions of the consumer program 160.

In embodiments in which a brick-and-mortar merchant 130 uses a POS terminal 432 to complete the purchase, employee of merchant 130 may click a button to begin the communication flow for registering a consumer 101 in consumer program 160. Employee of merchant 130 may use the buttons of POS terminal 432 to input the unique identifier 109 (e.g., mobile phone number). Next, employee may swipe form of payment 402 with POS terminal 432 (or use near field communications to transmit mobile wallet data 202 to POS terminal 432), when prompted by POS terminal 432. POS terminal 432 or any other device may tokenize data associated with form of payment 402, along with the unique identifier 109 and other data provided by consumer 101, and transmit it to payment system 140, consumer program 160, and/or payment matching system 160. In some embodiments, certain identifying information of consumer 101 may be obtained from form of payment 402. For example, form of payment 402 may be a credit card with a magnetic stripe or a mobile wallet that may include additional information about consumer 101.

System 100 may send a communication request to consumer 101 asking for consumer 101 to opt-in to the consumer program 160 at the point of sale. If a consumer 101 opts-out, data associated with consumer 101 and consumer's 101 associated form of payment 402 may be deleted from the database 156 or any other device in system 100. In the illustrated embodiment, a communication request may require the consumer 101 to reply with another communication with "Y" or "Yes" to confirm enrollment in the consumer program 160. Upon confirming enrollment, system 100 may send a follow-up communication that welcomes consumer 101 to the consumer program 160. In some embodiments, the follow-up communication may require consumer 101 to complete one or more steps via a web site or other means to complete registration. In some embodiments, consumer 101 may be automatically registered without having to access a web site or submit any further information. In some embodiments, consumer 101 may need to agree to certain terms and conditions of consumer program 160.

Illustrated in FIG. 5 is an exemplary flow diagram illustrating an embodiment for registering in the consumer program 160 of the system 100 of FIG. 1. This figure illustrates the interaction between some of the system elements described in FIG. 1. While there are certain elements shown in FIG. 1 that are not illustrated in FIG. 5 and vice versa, one of ordinary skill in the art would be able to advantageously describe with respect to one figure in order to achieve the advantages described herein for operation with the embodiments shown in other figures. All such embodiments are understood by one of ordinary skill in the art to be encompassed within the present specification. Within the system 100 of FIG. 1, an activation code may be used to register consumers 101 in a consumer program 160. At step 502, consumer 101 uses a form of payment 102 at merchant 130. At step 504, system 100 may determine if form of payment 102 is registered with a consumer program 160 or consumer reward associated with merchant 130. For example, upon presentment of form of payment 102, merchant 130 and/or POS terminal 132 and/or payment system 140 and/or consumer program 160 may automatically determine if the form of payment 102 used to make the purchase is associated with a consumer program 160 or consumer reward associated with merchant 130. If form of payment 102 is registered, the flow continues at step 508. If form of payment 102 is not registered, the flow continues at step 512.

At step 512, system 100 may generate an activation code. An activation code is anything that may be used to associate the form of payment 102 of a consumer 101 who has not yet enrolled in consumer program 160 with the consumer program 160 or consumer reward of merchant 130. The activation code may be generated by matching server 152 in rewards processing system 150. The activation code may be generated in real-time based on tokenized data received from payment system 140, which allows for the secure transmittal of the consumer's 101 form of payment 102 information. By associating the form of payment 102 used by a consumer 101 who has not yet enrolled in consumer program 160 with the consumer program 160 or consumer reward, this allows consumer 101 to use the activation code generated in real-time to easily enroll in the consumer program 160 using a client device 103, 104 at the point of sale or gradually enroll at a later time.

At step 514, the system 100 may request consumer 101 to register in consumer program 160 using the activation code. The process for registering a consumer 101 may have one or many steps to complete the registration. In some embodiments, consumer 101 and/or form of payment 102 may be automatically registered into consumer program 160 during the initial purchase made using the form of payment 102 at merchant 130. For example, a client device 103, 104 (e.g., mobile phone) may use near field communications to transmit its form of payment 102 (e.g., mobile wallet or mobile bank account) information to a POS terminal 132 at merchant 130 to complete the purchase. Transparent to the consumer 101, POS terminal 132 may automatically determine the address of client device 103, 104 and send an opt-in request message with the activation code to client device 103, 104 asking if consumer 101 would like to enroll in consumer program 160, or asking consumer 101 for other identifier data 109. Consumer 101 can opt-in and register in consumer program 160 via client device 103, 104 using the activation code seamlessly and easily.

Figure 6:
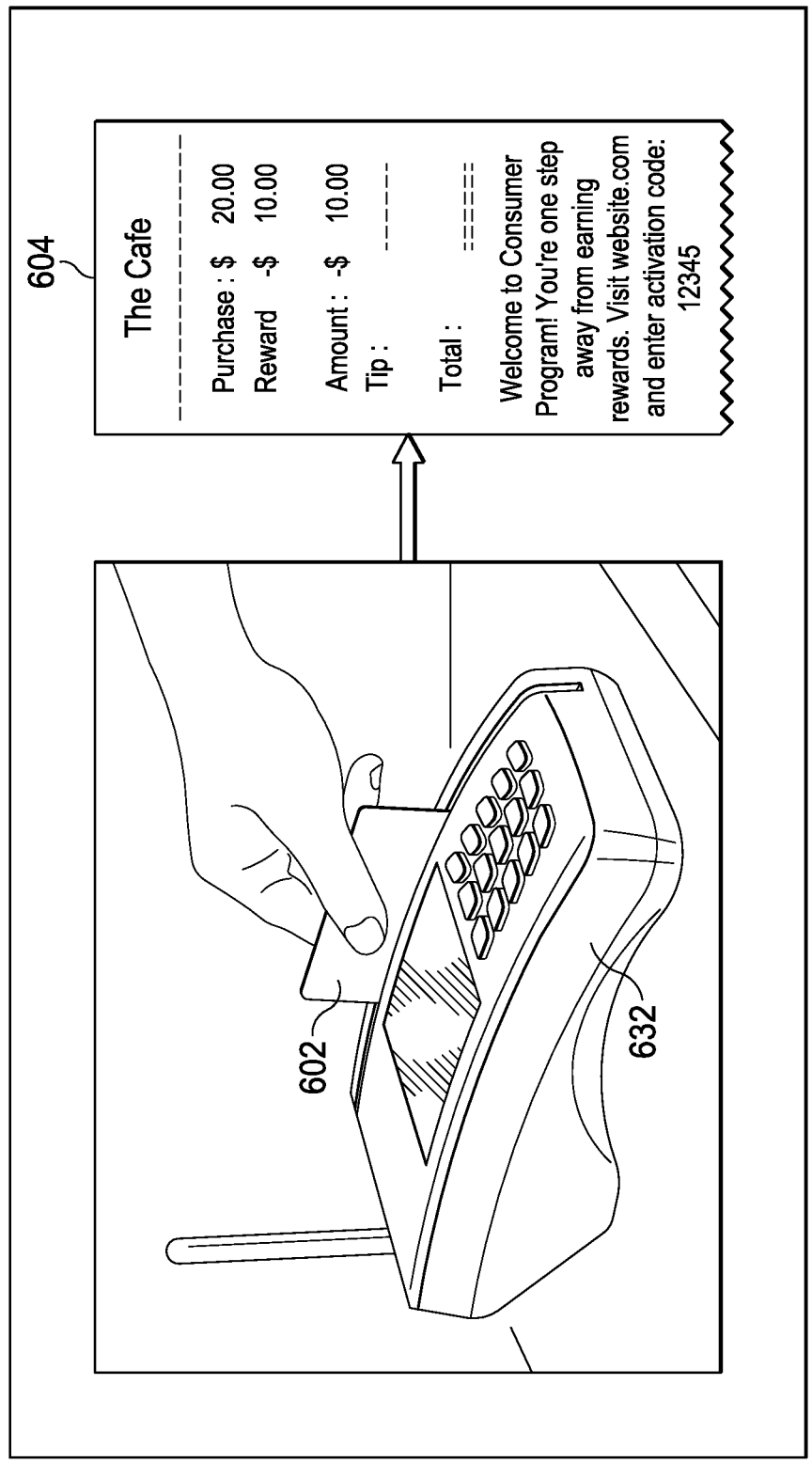
FIG. 6 is an exemplary block diagram of an embodiment for registering in a consumer program using an activation code on a receipt.

In one embodiment, the activation code may be printed on a receipt presented to consumer 101 at the POS terminal 132, as further shown in FIG. 6. The receipt may include instructions for a consumer 101 to register in a consumer program 160 using the activation code. For example, the receipt may include instructions for the consumer 101 to enter the activation code on a web site associated with the consumer program 160. The receipt may also include instructions for the consumer 101 to enter additional identifier data 109 on the web site associated with the consumer program 160 in order to complete registration.

Figure 7:
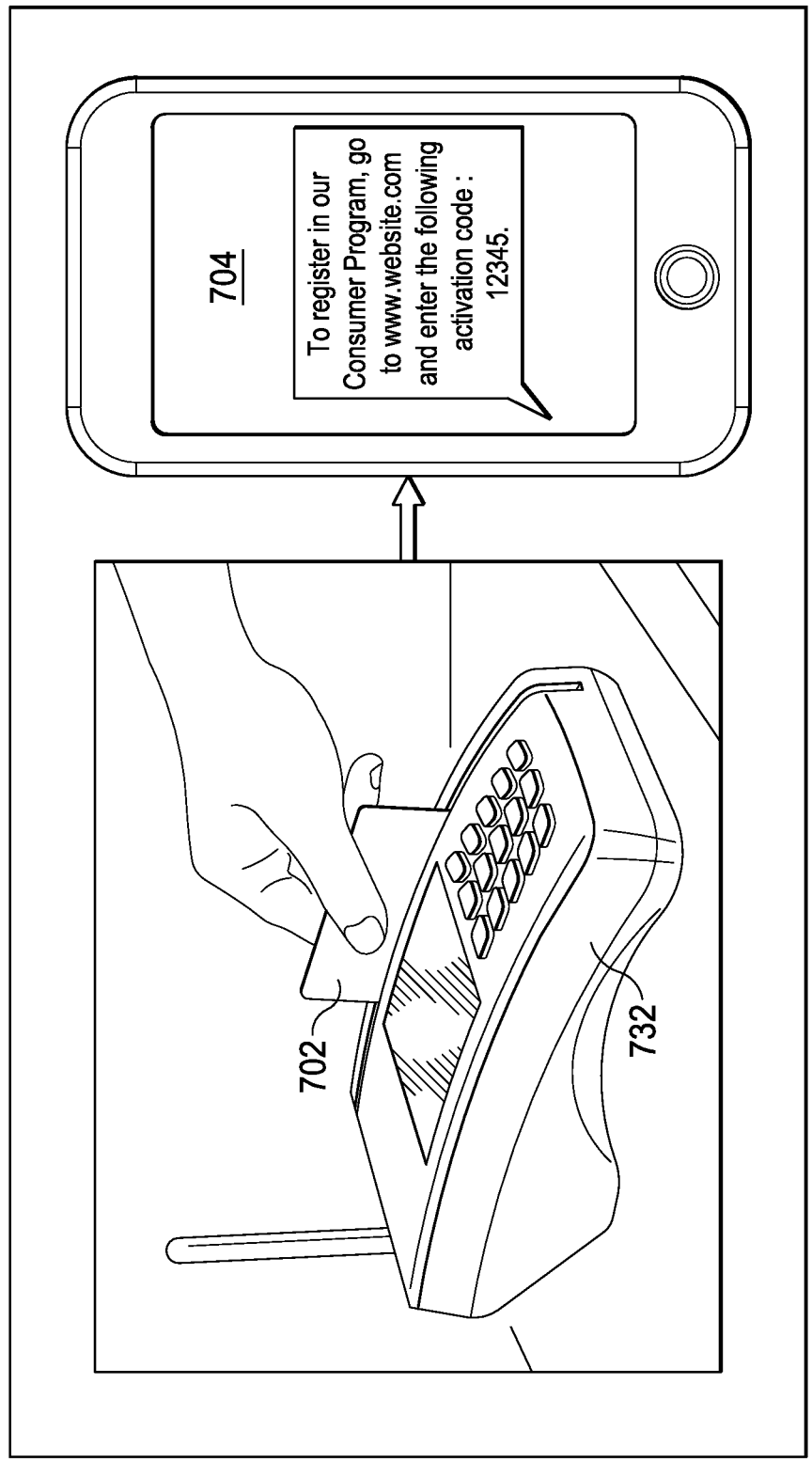
FIG. 7 is an exemplary block diagram of an embodiment for registering in a consumer program using an activation code sent via text message.

In another embodiment, the activation code associated with consumer's 101 form of payment 102 may be sent to a consumer 101 or a consumer's 101 client device 103, 104 using a communication request, as further shown in FIG. 7. In the illustrated embodiment, a merchant 130 may request identifier data 109 (e.g., mobile phone number) from consumer 101 so that merchant 130 has identifier data 109 to send a communication request or opt-in message to consumer 101 for registering form of payment 102 with consumer program 160. The communication request may include the activation code. The communication request may also provide instructions for consumer 101 and/or client device 103, 104 to register in the consumer program 160 using the activation code. In some embodiments, the communication request may require the consumer 101 to go to a web site to enter the activation code to confirm enrollment in the consumer program 160. Upon confirming enrollment, system 100 may send a follow-up communication that welcomes consumer 101 to the consumer program 160. In some embodiments, the follow-up communication may require consumer 101 to complete one or more steps via a web site or other means to complete registration. In some embodiments, the follow-up communication may require consumer 101 to enter the activation code on a web site to complete registration. In other embodiments, consumer 101 may be automatically registered using the activation code without having to access a web site or submit any further information. In some embodiments, consumer 101 may need to agree to certain terms and conditions of consumer program 160.

At step 506, if system 100 determines that the form of payment 102 is associated with a consumer program 160 or qualifying consumer reward, system 100 may automatically apply any qualifying consumer rewards, to the purchase as indicated in steps 508, and 510.

Illustrated in FIG. 6 is an exemplary block diagram illustrating an embodiment for registering in the consumer program 160 of the system 100 of FIG. 1. This figure illustrates the interaction between some of the system elements described in FIG. 1. While there are certain elements shown in FIG. 1 that are not illustrated in FIG. 6 and vice versa, one of ordinary skill in the art would be able to advantageously describe with respect to one figure in order to achieve the advantages described herein for operation with the embodiments shown in other figures. All such embodiments are understood by one of ordinary skill in the art to be encompassed within the present specification. Within the system 100 of FIG. 1, consumer 101 may register in a consumer program 160 using an activation code printed on a receipt 606 at the POS terminal 632. The receipt 606 provided by POS terminal 632 may include the activation code associated with the consumer's 101 form of payment 602, as described in FIG. 5. The receipt 606 may also include instructions for consumer 101 to register in consumer program 160 using the activation code. For example, the receipt 606 may include instructions for consumer 101 to enter the activation code on a web site associated with the consumer program 160. In an embodiment, the receipt 606 may also include instructions for the consumer 101 to provide identifier data 109 (e.g., client address, mobile wallet identifier, phone number, e-mail address, name of consumer 101, address of consumer 101, username, etc.) to merchant 130 (or any other element in FIG. 1) to complete registration in consumer program 160.

Illustrated in FIG. 7 is an exemplary block diagram illustrating an embodiment for registering in the consumer program 160 of the system 100 of FIG. 1. This figure illustrates the interaction between some of the system elements described in FIG. 1. While there are certain elements shown in FIG. 1 that are not illustrated in FIG. 7 and vice versa, one of ordinary skill in the art would be able to advantageously describe with respect to one figure in order to achieve the advantages described herein for operation with the embodiments shown in other figures. All such embodiments are understood by one of ordinary skill in the art to be encompassed within the present specification. Within the system 100 of FIG. 1, consumer 101 may register in a consumer program 160 using an activation code associated with a consumer's 101 form of payment 702 that is sent to the consumer's 101 client device 703, 704 using a communication request. Consumer 101 uses a form of payment 702 at merchant 130. System 100 may determine if form of payment 102 is registered with a consumer program 160 or consumer reward associated with merchant 130. For example, upon presentment of form of payment 102, merchant 130 and/or POS terminal 132 and/or payment system 140 and/or consumer program 160 may automatically determine if the form of payment 102 used to make the purchase is associated with a consumer program 160 or consumer reward associated with merchant 130.

If form of payment 102 is not registered, system 100 may generate an activation code that associates the consumer's 101 form of payment 102 with the consumer program 160 or consumer reward. The system 100 may request consumer 101 to opt-in to consumer program using the activation code. In one embodiment, the activation code may be printed on a receipt presented to consumer 101 at the POS terminal 132. The receipt may also include instructions for a consumer 101 to register in a consumer program 160 using the activation code. For example, the receipt may include instructions for the consumer 101 to enter the activation code on a web site associated with the consumer program 160. The receipt may also include instructions for the consumer 101 to enter additional identifier data 109 on the web site associated with the consumer program 160 in order to complete registration. The activation code associated with consumer's 101 form of payment 702 presented at the POS terminal 432 may be sent to the consumer's 101 client device 703, 704 using a communication request. The communication request may be sent to the consumer's 101 client device 703, 704, via e-mail, text message, near-field communication (e.g., Bluetooth, Wi-Fi, etc.), or other electronic communication means. The communication request may include instructions for consumer 101 to register in consumer program 160. For example, the communication request may include instructions for consumer 101 to enter the activation code on a web site associated with the consumer program 160. The communication request may include instructions for consumer 101 to enter additional identifying data 109 to complete registration in the consumer program 160.

Illustrated in FIG. 8 is an exemplary flow diagram illustrating an embodiment for registering in the consumer program 160 of the system 100 of FIG. 1. This figure illustrates the interaction between some of the system elements described in FIG. 1. While there are certain elements shown in FIG. 1 that are not illustrated in FIG. 8 and vice versa, one of ordinary skill in the art would be able to advantageously describe with respect to one figure in order to achieve the advantages described herein for operation with the embodiments shown in other figures. All such embodiments are understood by one of ordinary skill in the art to be encompassed within the present specification. Within the system 100 of FIG. 1, consumer 101 may register in a consumer program 160 using a network 105. At step 802, consumer 101 may log on to or access a network 105 (e.g., a Wi-Fi network of a merchant 130). At step 804, network 105 may request an identifier 109 of consumer 101. In some embodiments, network 105 may request an identifier 109 associated with client device 103, 104 (e.g., phone number of mobile device) or consumer 101 (e.g., username for a web site). Consumer 101 may provide the requested identifier 109 to the network 105 using their client device 103, 104. In some embodiments, the identifier 109 may be automatically obtained by the network 105.

At step 806, consumer 101 may agree to enroll in a consumer program 160. In some embodiments, consumer 101 may be presented with and agree to the terms and conditions for registering in a consumer program 160 via client device 103, 104, such as a mobile device. An opt-in message may provide instructions for consumer 101 and/or client device 103, 104 to register in consumer program 160. The process for registering a consumer 101 may have one or many steps to complete the registration. In some embodiments, consumer 101 and/or form of payment 102 may be automatically registered into consumer program 160 during the process of accessing the network 105. Consumer 101 can opt-in and register in consumer program 160 via client device 103, 104 seamlessly and easily. In some embodiments, a communication request may require the consumer 101 to reply with another communication, such as "Y" or "Yes," to confirm enrollment in the consumer program 160. Upon confirming enrollment, system 100 may send a follow-up communication that welcomes consumer 101 to the consumer program 160. In some embodiments, the follow-up communication may require consumer 101 to complete one or more steps via a web site or other means to complete registration. In some embodiments, consumer 101 may be automatically registered without having to access a web site or submit any further information.

At step 808, consumer 101 may receive and accept an offer associated with a merchant 130. In some embodiments, the offers received by consumer 101 may be based on the network 105 access by consumer 101 and/or the geolocation of consumer 101 that may be determined by the geolocation of client device 103, 104. At step 810, consumer program 160 may receive the requested identifier 109 and the accepted offer. The mechanism in which consumer 101 may accept an offer may occur in any manner. For example, consumer 101 may receive an offer via text message and communicate via text message that consumer 101 accepted the offer presented. In other embodiments, consumer's 101 client device 103, 104 may be automatically directed to a web site having an offer, and consumer 101 may click to accept the offer. System 100 may receive consumer's 101 acceptance of one or more offers and/or an identifier 109 associated with consumer 101 or consumer's 101 client device 103, 104 in real-time. In some embodiments, system may link the accepted offer to the account of the consumer program 160 associated with the identifier 109.

At step 812, consumer 101 may use a form of payment 102 to make purchase at merchant 130. At step 814, system 100 may determine if form of payment 102 is registered with an account associated with a consumer program 160 or consumer reward associated with merchant 130. For example, upon presentment of form of payment 102, merchant 130 and/or POS terminal 132 and/or payment system 140 and/or consumer program 160 may automatically determine if the form of payment 102 used to make the purchase is associated with an account of a consumer program 160 or consumer reward associated with merchant 130. If form of payment 102 is registered, the flow continues at step 826. If form of payment 102 is not registered, the flow continues at step 816.

At step 816, system 100 may instruct the POS terminal 132 to request the cashier to obtain an identifier 109 from consumer 101. In some embodiments, the requested identifier 109 may be the same identifier 109 previously provided by consumer 101 or consumer's 101 client device 103, 104 to gain access to the network 105. For example, the requested identifier 109 may be associated with client device 103, 104 (e.g., phone number of mobile device) or associated with consumer 101 (e.g., username for a web site). The mechanism in which merchant 130 can request the identifier 109 may occur in any manner. In some embodiments, the merchant 130 or consumer 101 may input the requested identifier 109 into POS terminal 132. In some embodiments, merchant 130 (or any other element in FIG. 1, such as consumer program 160) may initiate a communication (e.g., e-mail, text message, web-page, post to consumer's 101 social web site, near field communication, employee of merchant 130 asking consumer 101, etc.) to client device 103, 104 requesting the identifier 109. At step 818, the requested identifier 109 and information associated with the form of payment 102 (e.g., a cookie) may be transmitted to and received by the consumer program 160. In some embodiments, the identifier 109 may be automatically obtained by the POS terminal 132.

At step 820, consumer program 160 may automatically determine that the identifier 109 received during the transaction at the merchant 130 is associated with the same account for a consumer program 160 as the identifier 109 obtained by the network 105 that presented the consumer 101 with the offer that was accepted by consumer 101. In some embodiments, the identifiers 109 may be identical (e.g., the phone number of mobile device.) In some embodiments, the identifiers 109 may be different (e.g., identifier 109 from network 105 may be a phone number of mobile device and identifier 109 from POS terminal 132 may be a username). In some embodiments, system 100 may store and/or link the information associated with the form of payment 102 to consumer's 101 consumer program 160 account.

At step 822, system 100 may automatically apply the accepted offer (e.g., discount, gift, coupon, etc.) that was previously received by consumer 101 from the network 105, or any qualifying consumer rewards, to the purchase during the point of sale. Thus, the present disclosure allows for consumers 101 to seamlessly register for and accept targeted offers for merchants 130 in their areas to immediately take advantage of an offer for a purchase at a nearby merchant 130. Upon use of the form of payment 102, merchant 130 may send an Authorization Request ("AR") to the payment system 140. In such a transaction, entity logically referred to here as payment system 140 may be comprised of a credit clearing bank or acquiring bank computer system that communicates with the merchant 130, a credit card issuing computer system that manages the cardholder/consumer 101 accounts, and a credit card association server that is associated with the particular credit card association, such as Visa® or Master- Card®. These various servers all communicate in order to clear the ARs and reconcile the cardholders' credit card statements. Once the AR has been cleared, the payment system 140, which as discussed above comprises the servers of one or more entities, may send an Approval Code ("AC") back to the merchant 130 for the requested transaction. This transaction will also trigger the redemption of the accepted offer that was previously received by consumer 101 from the network 105, or any other qualifying consumer rewards, for purchases associated with merchant 130, although there are a number of possible methods by which this redemption can be accomplished. At step 424, the discounted amount from the accepted offer obtained via the network 105, or discounts from any other qualifying consumer reward, are automatically reflected in the receipt printed off at the point of sale.

At step 826, if system 100 determines that the form of payment 102 is associated with an account having a consumer program 160 or qualifying consumer reward, system 100 may automatically apply the accepted offer obtained via the network 105, or any other qualifying consumer rewards, to the purchase as indicated in steps 822, and 824.

Figure 9A:
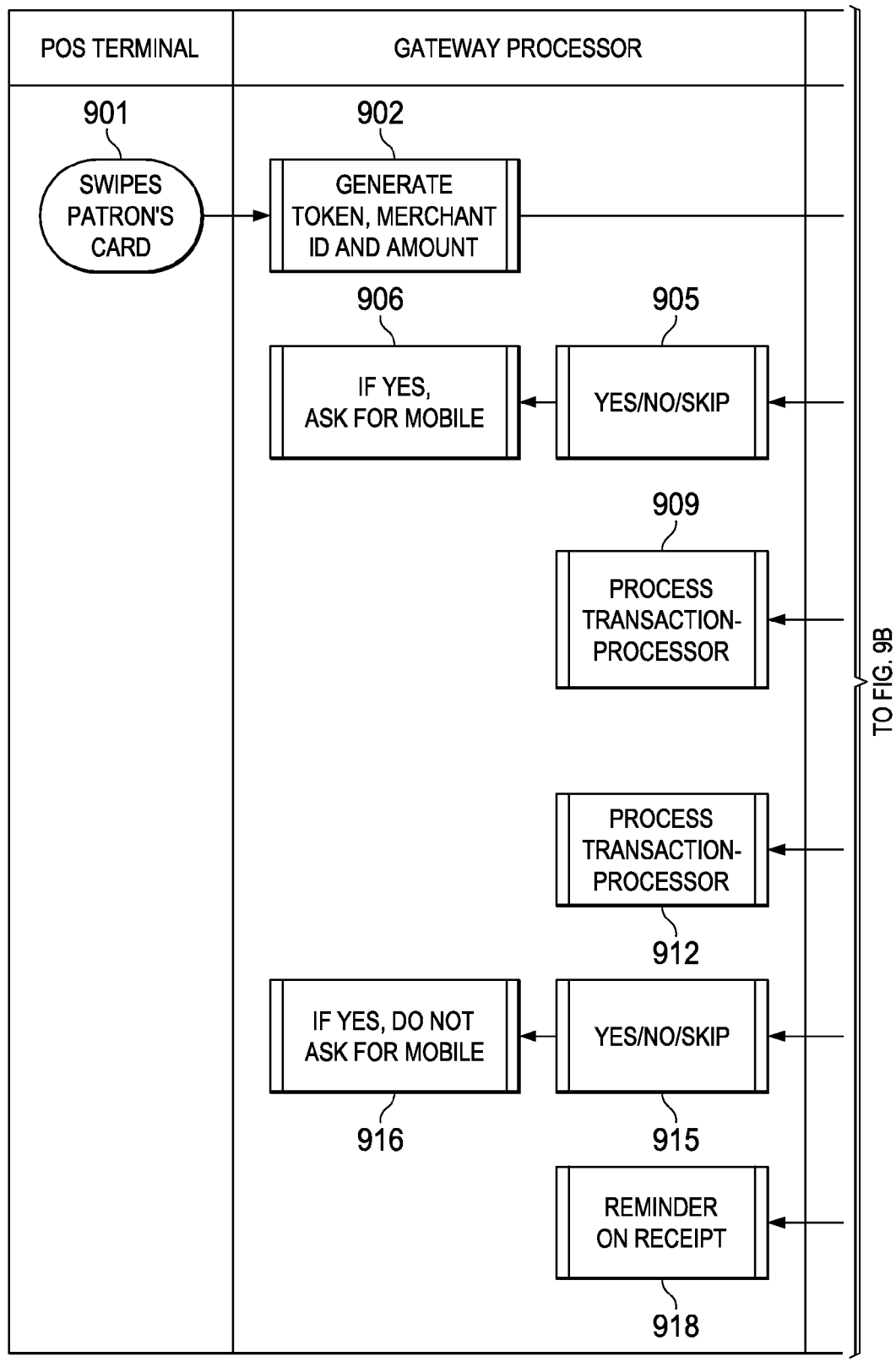
FIGS. 9A-9B is an exemplary flow diagram illustrating an embodiment of the disclosed principles.
Figure 9B:
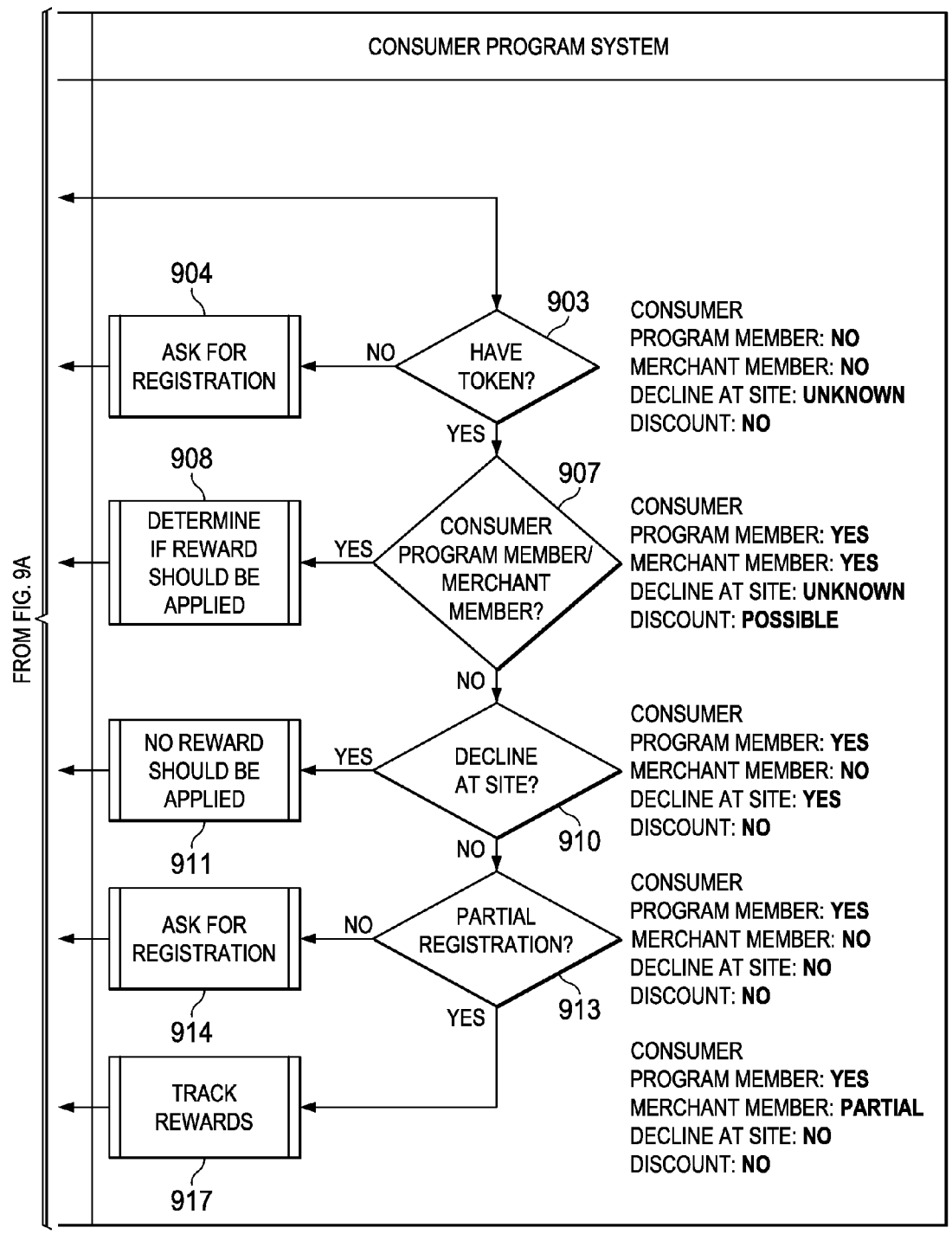

Illustrated in FIGS. 9A-9B is an exemplary flow diagram illustrating an embodiment for registering in the consumer program 160 of the system 100 of FIG. 1. At action 901, consumer's 101 form of payment 102 is swiped at the POS terminal 132. At action 902, gateway processor 150 generates a token, merchant ID, and amount, and sends the same to the consumer program system 190. In an embodiment, the token may be generated by payment system 140 At action 903, the consumer program system 190 determines whether the consumer program system 190 has the token. If the consumer program system 190 does not have the token, the consumer program system 190 asks for registration at action 904. At action 905, gateway processor 150 asks whether consumer 101 wants to register, not register, or skip registration. If the consumer 101 says yes to registration, gateway processor 150 asks for the consumer's 101 mobile number. Consumer 101 may then register in consumer program 160 by responding to a text message may sent to the consumer's 101 client device 103, 104, or entering an activation code sent the client device 103, 104 on a website.

If the consumer program system 190 does not have the token, the process continues at action 907. At action 907, the consumer program system 190 determines whether the consumer 101 is a consumer program 160 member and a merchant 130 member. If consumer 101 is a consumer program 160 member and a merchant 130 member, consumer program system 190 determines that a consumer reward should be applied at action 908, and gateway processor 150 processes the transaction with the consumer reward at action 909.

If consumer 101 is a consumer program 160 member, but is not a merchant 130 member, then the process continues at action 910. At action 910, consumer program system 190 determines whether consumer 101 declined registration at merchant 130. If consumer 101 did decline registration at merchant 130, consumer program system 190 instructs gateway processor 150 that no reward should be applied at action 911, and gateway processor 150 processes the transaction at action 912 without applying any rewards. If consumer 101 did not decline registration at merchant 130, the process continues at action 913. At action 913, the consumer program system 190 determines whether there is partial registration. If there is no partial registration, the consumer program system 190 asks for registration at action 914. At action 915, gateway processor 150 asks whether consumer 101 wants to register, not register, or skip registration. If consumer 101 wants to register, the system does not ask for consumer's 101 mobile number. If there is partial registration, consumer program system 190 tracks rewards at action 917, and gateway processor 150 instructs POS terminal 132 to print a reminder on the receipt at action 918.

The steps illustrated in FIGS. 3, 5, 8 and 9A-9B may be combined, modified, or deleted where appropriate, and additional steps may also be added to those shown. Additionally, the steps may be performed in any suitable order without departing from the scope of the present disclosure.

References to credit cards in the specific embodiments above should be understood to refer broadly to other payments systems and methods such as debit cards, electronic payment systems, automated billing systems, or other payment systems, including other billing systems described in this application. "Coupons," "coupon offers," and "promotional offers" and "rewards" should be broadly construed to include tickets, vouchers purchased for value, and other items that are redeemable or otherwise have value, such as frequent flyer miles or other "points" or "credits" that may be redeemable for reward goods and/or services.

In all the above-described embodiments, the actual locations of the elements and the nature of the communications between different elements may be adapted depending on system design considerations. For example, depending on the relative locations of the user databases 162 and the sites receiving transaction data from the POS terminals 132, it may not be necessary to have redemption notices and coupon notices sent. Web sites and web servers associated with consumer programs 160 may be owned or operated by the merchant 130, payment system 140, rewards processing system 150, merchant headquarters 180, or other entity.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

The invention claimed is:

1. A system for registering consumers and associated forms of payment in a consumer program, the system comprising:
    a computer-server connected to a network;
    a database connected to the computer-server for storing consumer information;

wherein the computer-server is operable to:
receive, from a payment system via electronic communications over the network, a token associated with a form of payment, wherein the form of payment is associated with a transaction initiated by the consumer at a merchant associated with the consumer program;
compare the token associated with the form of payment with consumer program member records of the database to determine whether the form of payment is associated with a registered consumer program member;
if the comparison determines that the token is not associated with a registered consumer program member, instruct a point of sale terminal at the merchant to input an electronic address associated with a client device of the consumer;
transmit information for registering in the consumer program to the electronic address associated with the client device of the consumer, wherein the electronic address was entered into the point of sale terminal at the merchant;
receive an electronic communication from the consumer indicating that the consumer is registering the form of payment in the consumer program, wherein the electronic communication is an electronic message; and
upon receipt of the electronic message, store the token associated with the form of payment in a record associated with the consumer in the database.

2. The system of claim 1, wherein the computer-server comprises a gateway processor.

3. The system of claim 1, wherein the computer-server comprises multiple computer-servers.

4. The system of claim 1, wherein the database comprises multiple databases.

5. The system of claim 1, wherein the form of payment is selected from the group consisting of: credit cards, debit cards, electronic payment accounts, consumer billing systems, cell-phone-based electronic payment systems, and PDA-based electronic communication systems.

6. The system of claim 1, wherein the client device is selected from the group consisting of: mobile devices, cell phones, laptop computers, desktop computers, end user devices, video monitors, cameras, and PDAs.

7. The system of claim 1, wherein the electronic address is selected from the group consisting of: a mobile phone number, an e-mail address, and a device ID.

8. The system of claim 1, wherein the electronic address was entered into the point of sale terminal by an agent of the merchant.

9. The system of claim 1, wherein the point of sale terminal is a consumer-facing terminal.

10. The system of claim 9, wherein the consumer-facing terminal is a tablet, and wherein the consumer agrees to the terms and conditions of the consumer program using the tablet.

11. The system of claim 1, wherein the point of sale terminal is a cashier-facing terminal.

12. The system of claim 1, wherein the computer-server is further operable to transmit instructions to the point of sale terminal to apply consumer rewards to the transaction initiated by the consumer at the merchant associated with the consumer program.

13. The system of claim 12, wherein the computer-server is further operable to store transaction information in the database to track the consumer rewards applied to the transaction initiated by the consumer.

14. A system for registering a consumer in a consumer program, the system comprising:
a computer-server connected to a network;
a database connected to the computer-server for storing consumer information;
wherein the computer-server is operable to:
receive a token associated with a form of payment, wherein the form of payment is associated with a transaction initiated by the consumer at a merchant associated with the consumer program;
generate an activation code, wherein the activation code associates the consumer with the form of payment;
transmit the activation code to an electronic address associated with a client device of the consumer;
receive an electronic communication from the consumer associated with the activation code; and
upon receipt of the electronic communication, register the consumer in the consumer program and store the token associated with the form of payment in a record associated with the consumer in the database.

15. The system of claim 14, wherein the computer-server is further operable to transmit the activation code to the client device associated with the consumer via near-field communications.

16. The system of claim 14, wherein the client device is selected from the group consisting of: mobile devices, cell phones, laptop computers, desktop computers, end user devices, video monitors, cameras, and PDAs.

17. The system of claim 14, wherein the electronic address is selected from the group consisting of: a mobile phone number, an e-mail address, and a device ID.

18. The system of claim 14, wherein the electronic communication from the consumer is selected from the group consisting of: an SMS message and an e-mail.

19. The system of claim 14, wherein the computer-server comprises multiple computer-servers.

20. The system of claim 14, wherein the database comprises multiple databases.

21. The system of claim 14, wherein the computer-server is operable to transmit the activation code to a point of sale terminal, wherein the point of sale terminal prints the activation code on a receipt presented to the consumer.

22. The system of claim 14, wherein the computer-server is operable to receive the electronic communication as the activation code that has been inputted by the consumer at a website associated with the consumer program indicating that the consumer is registering in the consumer program.

23. A method for registering a consumer in a consumer program, the method comprising:
receiving, from a merchant associated with the consumer program, at a computer-server connected to a network, a token associated with a form of payment, wherein the form of payment is associated with a transaction initiated by the consumer at the merchant;
transmitting, by the computer-server, information for registering in the consumer program to the consumer;
receiving, by the computer-server, an electronic communication from the consumer indicating that the consumer is registering in the consumer program;
automatically linking, by the computer-server, the form of payment with the consumer program in which the consumer is registered; and
storing the token associated with the form of payment in a record associated with the consumer in a database connected to the computer-server for storing consumer information.

24. The method of claim 23, wherein the merchant is an online merchant.

25. The method of claim 23, comprising transmitting, by the computer-server, information for registering in the consumer program to an electronic address associated with a client device of the consumer.

26. The method of claim 25, wherein the electronic address was received from a communication network associated with the merchant.

27. The method of claim 23, further comprising generating, by the computer-server, an activation code, wherein the activation code associates the consumer with the form of payment.

28. The method of claim 27, further comprising transmitting, by the computer-server, the activation code to a client device associated with the consumer.

29. The method of claim 27, further comprising transmitting, by the computer-server, the activation code to a point of sale terminal, wherein the point of sale terminal prints the activation code on a receipt presented to the consumer.

30. The method of claim 27, comprising receiving, by the computer-server, the electronic communication as the activation code that has been inputted by the consumer at a website associated with the consumer program indicating that the consumer is registering in the consumer program.

* * * * *